Patented Sept. 11, 1951

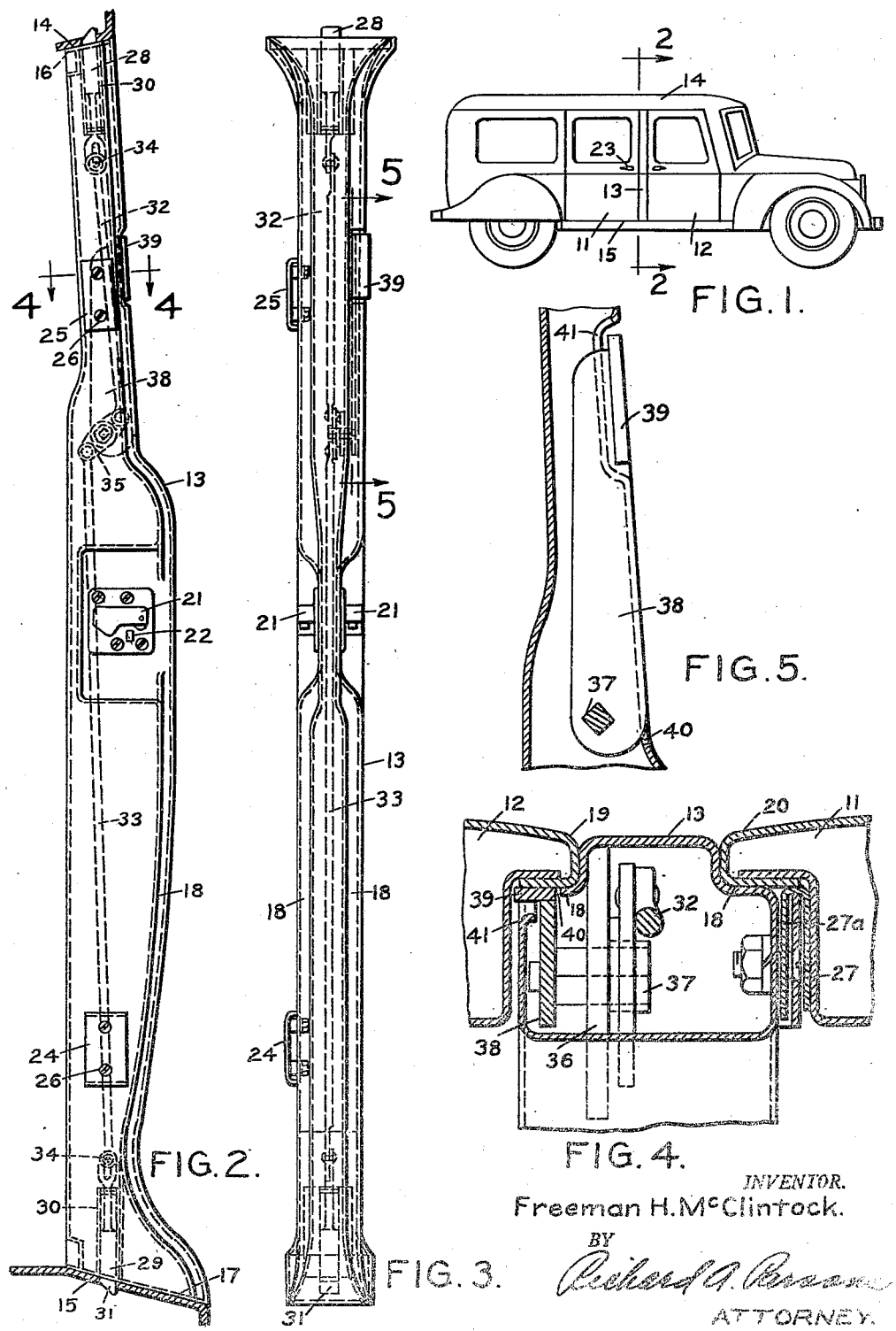

2,567,294

UNITED STATES PATENT OFFICE 2,567,294

VEHICLE BODY CONVERTIBLE TO AMBULANCE USE

Freeman H. McClintock, Lansing, Mich.

Application June 15, 1949, Serial No. 99,279

3 Claims. (Cl. 296—28)

This invention relates to automobile bodies, and more particularly to the doors, and door pillars thereof.

The invention comprises a door pillar for automobile bodies of the four door sedan type, in which the door pillar is releasably connected to one door and to the body itself, whereby when the pillar is connected to a door, and both doors are opened, a stretcher may be readily placed in the automobile and the latter used as an ambulance. The invention is particularly characterized by a novel form of latch mechanism and handle that is convenient to operate, but which is concealed when the doors are closed, to prevent accidental operation of the handle, as well as to improve the appearance of the automobile body.

In the drawings:

Figure 1 is a side elevational view of an automobile body embodying the invention;

Figure 2 is a fragmentary cross-sectional view taken on substantially the line 2—2 of Figure 1;

Figure 3 is a side elevational view of the improved pillar;

Figure 4 is a fragmentary cross-sectional view taken on substantially the line 4—4 of Figure 2; and Figure 5 is a fragmentary cross-sectional view taken on substantially the line 5—5 of Figure 3.

Referring now more particularly to the drawings, Figure 1 illustrates an automobile body 10 of the four door sedan type having side doors 11 and 12 hingedly connected to the body at their rear and front edges respectively so that they close and latch against a common center pillar 13. Above the doors is a roof rail 14 and at the bottom is a door sill member 15 of conventional construction to which the pillar 13 is releasably connected, as will be more fully described presently.

The pillar 13 is in the form of a sheet metal tubular member, the general cross-section of which is shown in Figure 4. It extends from the roof rail 14 to the sill 15 and is fashioned to fit tightly against those members. The upper and lower ends of the pillar are provided with end plates 16 and 17 respectively, preferably welded to the side walls of the pillar. The outer wall of the pillar 13 is provided with rabbets 18 which receive the door overlap flanges 19 and 20.

Mounted on the front and rear walls of the door pillar are the usual dove tail wedges 21 which are received in the conventional sockets in the doors. The pillar is also provided with latch bolt keepers 22 in which the conventional latch bolts of the doors, and which are operated by handles 23 on the doors, are received.

The rear wall of the pillar 13 is also provided with sockets 24 and 25. These are in the form of shallow U-shaped metal members with the flanges thereof contacting the rear wall of the pillar. The sockets are fastened to the pillar by screws 26.

The front jamb surface of the rear door 11 is provided with two hook shaped fasteners 27, only the upper one of which is shown in Figure 4. One leg of each fastener is welded or otherwise secured to the jamb face of the door, while the other leg 27a is spaced therefrom. Each fastener is mounted on the door in horizontal registry with the corresponding socket 24 and 25 so that the leg 27a will enter the appropriate socket when the door 11 is closed against the pillar 13.

When the door 11 is closed against the pillar, the dovetail 21, the sockets 24 and 25, and the fasteners 27 maintain the door and pillar in vertical registry. The latch bolt on the door located in the keeper opening 22, and the door overlap flange 20 received in rabbet 18 maintain horizontal registry of the door and pillar.

Latch mechanism for releasably connecting the pillar 13 to the roof rail 14 and sill 15 is also provided. This mechanism comprises a toggle mechanism for operating an upper bolt 28 and a lower bolt 29. The bolts are mounted in vertical guideways 30 within the hollow pillar and are received in keeper openings 31 in the roof rail and sill.

The bolts 28 and 29 are slotted at their adjacent ends. A pair of links 32 and 33 are pivotally connected to the bolts by pins 34 mounted in the slots. The other ends of the links 32 and 33 are pivotally connected to a rocking lever 35 which is in turn pivotally connected by a shaft 37 to a mounting plate 36. The latter is welded or otherwise secured to the pillar inside of the latter.

The shaft 37 is fixedly attached to a handle 38 located within the pillar 13. Preferably the handle is a flat metal strip which extends upwardly from the shaft and is provided at its upper end with a laterally extending flange or finger piece 39.

The pillar 13 is provided with a vertically elongated narrow slot 40 in the bottom of the rabbet 18 receiving the front door overlap flange 19. The slot extends from just above the upper end of the handle 38 to a level approximately at the lower end of the handle. See Figure 5. The metal of the pillar at the forward side of the slot is bent inwardly at 41 in the area of the finger piece 39 to provide a recess to receive the finger piece when the door 12 is closed. The handle 38 is then completely concealed and is prevented from accidental movement as long as door 12 is closed.

The handle 38 can be operated to release the latch bolts 28 and 29 by opening the door 12 to gain access to the finger piece 39. The finger piece is grasped and pulled outwardly and downwardly. The handle swings out through the slot 40, and through the lever 35 and links 32 and 33 the bolts 28 and 29 are retracted. The door 11 can then be pulled open carrying with it the pillar 13. That opens the entire side of the automobile body and permits a stretcher to be placed inside the body.

When the pillar is attached to the body by the bolts 28 and 29, both doors can be operated in the usual manner by actuating the door handles. When the conventional latch bolts are released it frees the doors from the pillar and permits them to be swung outwardly in the normal way.

From the foregoing it will be seen that this invention provides a simple and effective arrangement for converting a four door automobile body to ambulance use. The invention is safe and attractive because of the way in which the handle 38 is concealed and prevented from accidental movement by the door overlap flange.

The scope of the invention is indicated in the appended claims.

I claim:

1. The combination of a vehicle body of the sedan type provided with an entrance space at one side thereof defined in part by top and bottom rails, a pillar bridging said entrance space between the front and rear ends thereof, said pillar being provided with latch means engageable with said rails for removably latching said pillar to one of said rails, said latch means having a handle located partially exteriorly of said pillar and received in an outwardly opening recess therein, a pair of doors hingedly connected to said body, one of said doors being provided with a door overlap flange overlying and concealing said handle when said last mentioned door is closed, and means on said pillar and said other door for fixedly connecting said pillar to said last mentioned door so as to swing as a unit therewith when the latch means on the pillar is disengaged from said rails.

2. A vehicle body comprising top and bottom rails partially defining an entrance space at one side of said body, a vertical pillar bridging said space intermediate the front and rear ends thereof, latch means mounted on said pillar engageable with said rails for latching the latter to said rails, a rigid handle for operating said latch means, said handle being located exteriorly of said pillar in a recess in the outer face thereof, first and second doors hingedly connected to said body and having latch means adapted to latch said doors against said pillar, said first door having a door overlap flange overlying said handle when said first door is closed, and cooperating dove tail elements on said pillar and said second door engageable with each other to support said pillar on said second door when the latch means on the latter engages said pillar and the latch means on the pillar is disengaged from said rails.

3. A combination of a vehicle body of the sedan type having doors on one side thereof, a pillar between said doors, cooperating means on one of said doors and said pillar for connecting said pillar to said one door to swing as a unit therewith, said means including mechanism for latching said one door to said pillar, mechanism for latching said other door to said pillar, and latch means housed within said pillar for removably latching the latter to said body at the top and bottom, said last named latch means having a handle located exteriorly of said pillar in a position between said pillar and said other door, whereby it is concealed by said other door when the latter is closed and is accessible to release said pillar from the body when said other door is opened.

FREEMAN H. McCLINTOCK.

REFERENCES CITED

The following references are of record in the file of this patent:

UNITED STATES PATENTS

| Number | Name | Date |
|---|---|---|
| 1,639,037 | Hollingshead | Aug. 16, 1927 |
| 1,869,274 | Phillips | July 26, 1932 |